US006888356B2

(12) United States Patent
Jean-Raoul

(10) Patent No.: US 6,888,356 B2
(45) Date of Patent: May 3, 2005

(54) METHOD OF DETECTING PLASTICS ARTICLES, AND A DETECTOR DEVICE

(75) Inventor: Dian Jean-Raoul, Antony (FR)

(73) Assignee: Solystic, Gentilly Cedex (FR)

( * ) Notice: Subject to any disclaimer, the term of this patent is extended or adjusted under 35 U.S.C. 154(b) by 89 days.

(21) Appl. No.: 10/347,444

(22) Filed: Jan. 21, 2003

(65) Prior Publication Data

US 2003/0155388 A1 Aug. 21, 2003

(30) Foreign Application Priority Data

Feb. 5, 2002 (FR) ............................................ 02 01349

(51) Int. Cl.[7] ........................... G01N 27/60; B41J 29/18

(52) U.S. Cl. ........................ 324/452; 324/454; 400/708

(58) Field of Search ......................... 324/452, 453–456, 324/457–458; 400/708; 209/584, 564; 700/224, 218; 438/153, 154, 151, 166, 232, 164, 487, 795

(56) References Cited

U.S. PATENT DOCUMENTS 3,544,889 A * 12/1970 Alauzet et al. ............. 324/455
3,609,694 A 9/1971 Koslow et al.
3,757,942 A * 9/1973 Gunn ......................... 209/3.3
3,943,437 A * 3/1976 Mourier ...................... 324/455
4,557,386 A 12/1985 Buckley et al.
4,685,569 A * 8/1987 Osaki et al. ................ 209/571
5,315,254 A * 5/1994 Wang et al. ................ 324/452
5,371,649 A * 12/1994 Iwata et al. ................. 361/225
5,710,692 A * 1/1998 Muck et al. ................ 361/212
5,725,720 A * 3/1998 Micaletti et al. ............ 156/364
6,247,774 B1 * 6/2001 Mueller ......................... 347/2

FOREIGN PATENT DOCUMENTS

FR 2 807 347 A1 10/2001

* cited by examiner

*Primary Examiner*—Anjan Deb
*Assistant Examiner*—Jeff Natalini
(74) *Attorney, Agent, or Firm*—Sughrue Mion, PLLC

(57) ABSTRACT

The method of detecting plastics material, in particular for a postal sorting installation through which articles pass, is intended to distinguish automatically between articles having an outside surface made of plastics material and articles having an outside surface made of paper. The method consists in moving each article past an electrostatic generator, and then past a member for evaluating electrostatic charge so as to compare the charge on the article with a reference value in order to detect whether the article is a plastics article or a paper article. The method increases the reliability of detection.

6 Claims, 1 Drawing Sheet

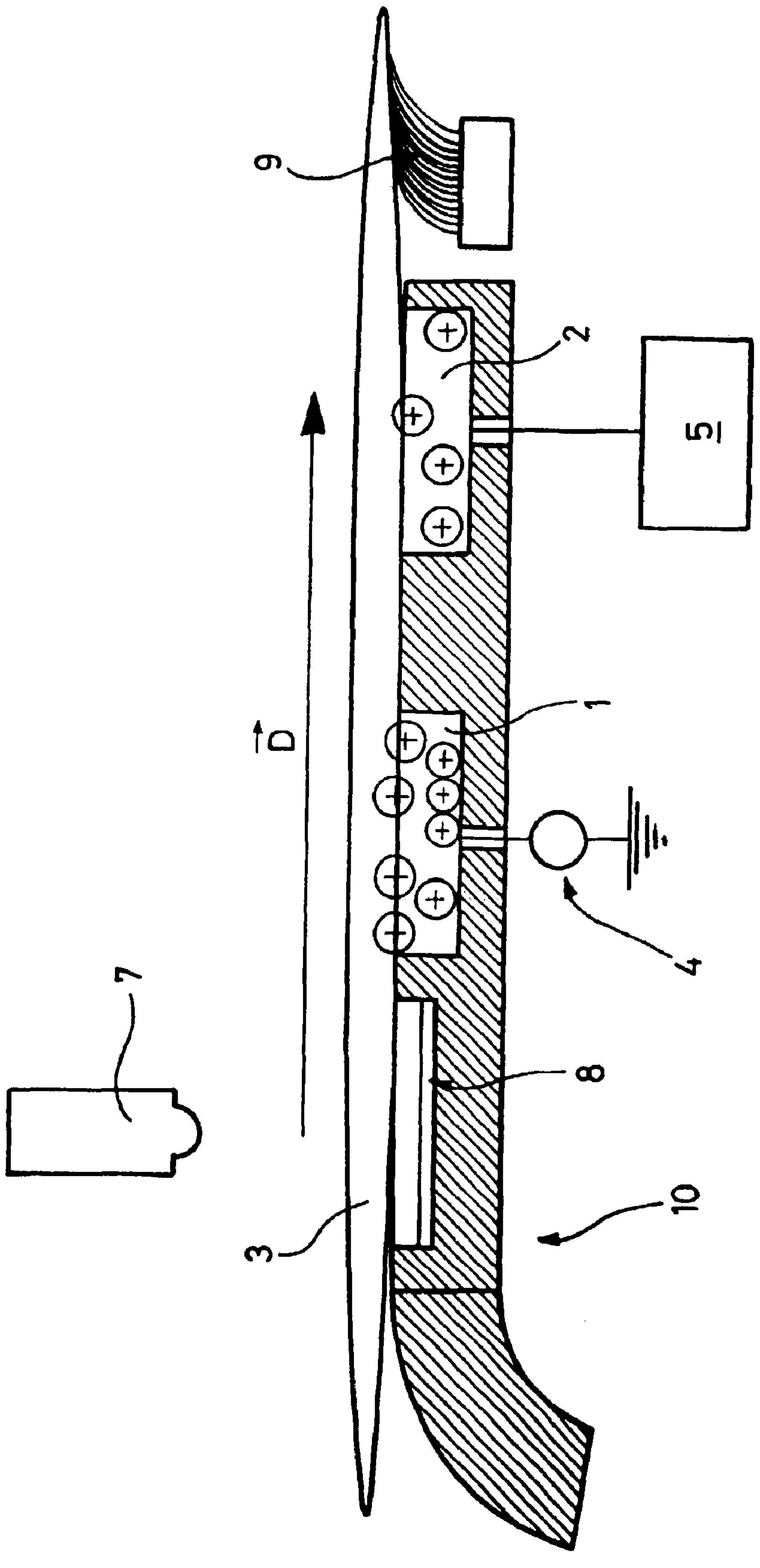
9
2
5
D
1
4
7
8
10
3

METHOD OF DETECTING PLASTICS ARTICLES, AND A DETECTOR DEVICE

The method relates to a method of detecting plastics material, in particular for a postal sorting installation through which articles travel, the method serving automatically to detect articles having an outside surface made of a plastics material and articles having an outside surface made of paper.

The invention is for use, for example, in a postal sorting installation in which it is desired to print a bar code on postal articles for sorting, but the invention is not limited to this particular application.

BACKGROUND OF THE INVENTION

The outside surface of postal articles is made either of plastics material or of paper, depending on whether the wrapping or the envelope is made of plastics material or of paper, for example such articles may be in the form of letters or of packets.

Bar codes can be printed directly on paper-covered articles, but that is not possible on plastics-covered articles which must initially have paper labels applied to them. Printing ink does not dry fast enough on plastics materials, in particular given the high rates of throughput in postal sorting installations. In order to minimize label consumption, a plastics material detector is generally provided so that labels are stuck only on plastics articles.

Various techniques are already known for detecting plastics articles. One known technique consists in illuminating the article and in measuring the light flux it reflects. The index of reflection of plastics material is greater than that of paper so detection is simple to implement. Nevertheless, that technique can be ineffective when plastics articles have an outside surface that is matt or colored, i.e. when they have an index of reflection that is close to that of paper. In addition, the large amount of dust that is to be found in the environment of a sorting installation interferes with light flux measurements. Another known technique is based on a pneumatic principle which consists in deforming the article under inspection by applying suction and in measuring the pressure variation associated with such deformation. Since the outside surface of a plastics-covered article is generally less rigid than the surface of a paper-covered article, detection is simple to implement. Nevertheless, the effectiveness of that technique is very sensitive to dust and requires the pressure sensor to be cleaned frequently in order to maintain satisfactory measurement accuracy.

In general, the methods presently in use for detecting plastics material present poor reliability rates, thereby wastefully increasing label consumption and thus the consumables cost of a working sorting installation.

OBJECT AND SUMMARY OF THE INVENTION

The object of the invention is to remedy that drawback by proposing a method of detecting plastics material that presents improved reliability, in particular for the purposes of reducing label consumption and maintenance costs on a postal sorting installation.

To this end, the invention provides a method of detecting plastics material, in particular for a postal sorting installation through which articles pass, the method being for automatically distinguishing between articles having an outside surface made of plastics material and articles having an outside surface made of paper, the method consisting in moving each article past a static electricity generator, and then past a member for evaluating electrostatic charge in order to compare the electrostatic charge of the article under test with a reference value in order to determine whether the article is a plastics article or a paper article. It has been found that the plastics materials used for wrapping, such as cellophane, polyester, tyvex, etc. have greater intrinsic ability to become electrostatically charged and to conserve that charge than paper or card. Implementing this method gives rise to a very high reliability rate in discriminating between plastics materials and paper materials.

The invention also provides a plastics material detector for implementing the detection method. The detector comprises a first electrically-conductive surface connected to a voltage generator constituting the static electricity generator, and a second electrically-conductive surface connected to a processor unit forming the member for evaluating electrostatic charge, the first and second conductive surfaces being separated from each other along the detector and being designed to be put into contact with each article to be tested. With this arrangement, the detector is suitable for use in a sorting machine in which the articles for sorting travel in succession along the detector.

The detector of the invention may further comprise a sensor for detecting the passage of articles in order to synchronize the evaluation of electrostatic charge on each article with the passage of that article along the second conductive surface, and an antistatic brush for discharging each article after its charge has been evaluated. Advantageously, the conductive surfaces and the antistatic brush are mounted on a support of insulating material, such as a molded ceramic support, for example, which support is in the form of a ski, with the articles to be tested traveling in succession therealong. With this arrangement, the sensor forms a compact unit that can easily be mounted on an existing sorting installation without fundamentally modifying the installation.

BRIEF DESCRIPTION OF THE DRAWING

The invention is described in greater detail below with reference to the accompanying drawing which shows an embodiment by way of non-limiting example.

The sole FIGURE is a longitudinal section view of the detector of the invention.

MORE DETAILED DESCRIPTION

The method of the invention is intended in particular for a postal sorting installation in which it is desired to detect or discriminate automatically between articles having an outside surface made of a plastics material and articles having an outside surface made of paper. In the invention, each article is moved past a static electricity generator in order to be charged electrostatically, and then past a member for evaluating electrostatic charge in order to compare its electrostatic charge with a reference value so as to determine whether the article is covered in plastics material or in paper. It has been found that the plastics materials used for wrapping, such as cellophane, polyester, tyvex, etc. have greater intrinsic ability to become electrostatically charged and to conserve their charge than paper or card. This quality presents the advantage of being independent of the type of plastics material used and of the packaging technique used (thermoforming, heat-shrinking, heat-sealing).

Each article can be electrostatically charged mechanically by the triboelectric effect, with the article being rubbed against a brush of suitable material such as wool or nylon. Electrostatic charging can alternatively be implemented without contact by means of an ion blower. The article can alternatively be electrostatically charged by being raised to a high voltage by being put into electrical contact with the electrostatic charge generator.

The electrostatic charge can be evaluated, for example, without contact by means of a field detector. Such evaluation can also be implemented by directly measuring the potential of the article with an electronic processor unit or a voltage-measuring device that is put into contact with the article in order to discover its electrostatic potential. More particularly, charge can be evaluated by providing an electronic signal representative of the electrostatic charge and then comparing said signal with a reference signal in an electronic processor unit in order to determine whether the tested article is made of plastics material or paper material.

The invention also provides a detector for implementing the method. The detector of the invention is shown in section in the sole figure and it comprises first and second conductive surfaces 1 and 2 forming parts respectively of the static electricity generator and of the member for evaluating electrostatic charge. The first conductive surface 1 is maintained under high voltage by being electrically connected to a voltage generator 4 in order to charge the article 3 for testing electrostatically, and the second conductive surface 2 is electrically connected to a processor unit 5 in order to evaluate the electrostatic charge of the tested article in order to deduce therefrom whether the article is made of plastics material or of paper material. The first and second conductive surfaces are mounted in this example on a support 10 along which the articles for testing 3 are caused to slide. In operation, the articles for testing are put into contact successively with the first and with the second conductive surfaces in order to be tested while traveling in a direction D. By way of example, both the first conductive surface and the second conductive surface could be implemented in the form of brushes having conducive bristles, for example, or by any other electrically conducive member capable of bringing its own electrostatic charge into equilibrium with that of the article to be tested merely by physical contact.

Advantageously, the conductive surfaces are metal plates in order to reduce the effects of wear on the detector due to friction against the articles. In a postal sorting installation having a throughput of 40,000 articles per hour, for example, the mechanical wear of postal articles on the various portions against which they rub is significant, and satisfactory use of a brush for electrostatically charging the articles would require that brush to be replaced periodically. The first and second plates are advantageously made of stainless steel, for example, which stainless steel is treated in order to guarantee the smallest possible mechanical wear so as to reduce the maintenance costs of the installation.

Electrostatic charge can be evaluated in any appropriate manner, for example by directly measuring the electrical potential of the second conductive surface when the article under test is in contact with said second conductive surface. As is known in the state of the art, the processor unit 5 may, for example, discharge the second conductive surface into a capacitor in order to be able to measure the resulting discharge current which is itself proportional to the electrostatic charge of the article under test.

The detector of the invention can also include a sensor 6 for detecting the passage of articles in order to synchronize the evaluation of electrostatic charge with the passage of articles along the detector. As shown in the sole figure, the detector is constituted in this case by a light emitter and receiver 7 facing a light reflector 8 so that the light beam emitted from 7 is reflected, providing no article is present along the detector, with said light beam being interrupted whenever an article such as the letter 3 is passing along the detector. With this arrangement, the first conductive plate can be connected to high voltage only when the presence of an article to be tested is identified by the passage sensor, for example, thereby reducing the risks of electrocuting an operator. By way of example, it has been found that a DC voltage of about 48 volts gives satisfactory results for detecting plastics articles. The electronic unit 5 is advantageously connected to the passage sensor, to the voltage generator, and to the second conductive plate in order to control the application of voltage and in order to trigger electrostatic charge evaluation on the basis of information provided by the passage sensor 7.

The detector of the invention can further comprise a device for discharging tested articles after their electrostatic potential has been evaluated. Such discharging is necessary to ensure that tested articles do not stick together under the effect of their electrostatic charge, since that would complicate subsequent sorting operations, as is known to the person skilled in the art. Discharging can be performed remotely by means of an ion blower, or by making electrical contact with a discharger member that is electrically connected to ground. In a preferred embodiment, an antistatic brush 9 is positioned at the end of the detector so that each article passes initially over the detector, then over the first conductive surface, then over the second conductive surface, and finally over the antistatic brush 9 in order to be discharged. The antistatic brush 9 shown in the sole figure is a carbon fiber brush that is known for its electricity conducting properties. Such a carbon fiber brush presents a long lifetime so it needs to be replaced only about once a year.

Advantageously, the reflector, the conductive surfaces, and the antistatic brush are mounted on a support 10 made of insulating material, for example a molded ceramic material, the support being substantially ski-shaped with the articles for storing being caused to slide along it in succession. Selecting a molded ceramic material for making the ski-shaped support ensures that the support does not itself become electrically charged by applying voltage to the first conductive surface, in order to avoid disturbing measurements. More generally, a ceramic material is advantageous both because of its antistatic qualities and because of its high degree of resistance to mechanical wear.

Such a detector can be integrated in an existing sorting installation without requiring fundamental modification of the installation. More particularly, the detector of the invention can be mounted in a zone for conveying postal articles by being positioned along an existing conveyor, or it can replace an existing plastics material detector. As known in the state of the art, such a detector may be positioned, for example, upstream from a sorting zone so as to control the sorting zone to send plastics articles to a labeling station and paper articles to a station for printing bar codes.

The invention is not restricted solely to an application to postal sorting, it can equally well be applied to other sectors whenever it is desirable to distinguish automatically between plastics articles and paper articles, for example in packaging lines.

What is claimed is:

1. A method for automatically detecting postal articles having an outside surface made of plastics material and postal articles having an outside surface made of paper in a postal sorting installation in which said articles pass, the method comprising the steps of:

electrostatically charging each postal article by moving it past and in contact with an electrostatic charging member;

evaluating electrostatic charge of said postal article by moving it past and in contact with an evaluating electrostatic charge member; and comparing said evaluated electrostatic charge with a reference value in order to determine whether said postal article is a plastics article or a paper article.

2. A postal sorting installation comprising a detector for automatically detecting postal articles having an outside surface made of plastics material and postal articles having an outside surface made of paper, said detector comprising a first conductive surface mounted on a support and electrically connected to a voltage generator constituting an electrostatic charging member, and a second conductive surface also mounted on the support and electrically connected to a processor unit forming an evaluating electrostatic charge member, said first and second conductive surfaces being separated from each other along said support to come successively into contact with each postal article moving through said postal sorting installation.

3. A postal sorting installation according to claim 2, further comprising a passage sensor for synchronising the electrostatic charge evaluation of each postal article with the passage of said postal article along said second conductive surface.

4. A postal sorting installation according to claim 2, further comprising an antistatic brush made of carbon fibers for electrostatically discharging each postal article after its electrostatic charge has been evaluated.

5. A postal sorting installation according to claim 2, in which said support is made of electrically insulating material and that is substantially ski-shaped, said postal articles being moved along said ski-shaped support come successively into contact with said first and second conductive surfaces.

6. A postal sorting installation according to claim 5, in which said support is made of molded ceramic material.

* * * * *